US005189288A

United States Patent [19]

Anno et al.

[11] Patent Number: 5,189,288

[45] Date of Patent: Feb. 23, 1993

[54] METHOD AND SYSTEM FOR AUTOMATED VOTING

[75] Inventors: Julien Anno, Dilbeek, Belgium; Russell F. Lewis, Dallas; Dale A. Cone, Garland, both of Tex.

[73] Assignee: Texas Instruments Incorporated, Dallas, Tex.

[21] Appl. No.: 641,029

[22] Filed: Jan. 14, 1991

[51] Int. Cl.[5] .......... G06F 15/21

[52] U.S. Cl. .......... 235/386; 364/409

[58] Field of Search .......... 235/386, 375; 364/409

[56] References Cited

U.S. PATENT DOCUMENTS 4,373,134 2/1983 Grace et al. .......... 235/386
4,774,665 9/1988 Webb .......... 364/409

FOREIGN PATENT DOCUMENTS 291281 11/1989 Japan .......... 235/375
2056146 3/1981 United Kingdom .......... 235/386

*Primary Examiner*—John W. Shepperd
*Attorney, Agent, or Firm*—L. Joy Griebenow; William E. Hiller; Richard L. Donaldson

[57] ABSTRACT

There is disclosed a system and method for establishing a vote tabulation system. A voter receives a mechanical card, or key, onto which there is placed data in machine readable form which allows the voter to gain access to any one of a number of portable terminals. The information on the card controls the presentation of names or issues to the particular voter and also controls the language for presentation of the voter's choices. The terminal tabulates all of the votes and also modifies the card to prevent revoting and to record the tabulated results. A depository is used to store the individual cards from all the terminals and to record as a cross check the tabulated results which were recorded on the individual cards. The depository total tabulated count is compared against the sums stored on removable memories from the individual terminals.

38 Claims, 1 Drawing Sheet

METHOD AND SYSTEM FOR AUTOMATED VOTING

TECHNICAL FIELD OF THE INVENTION

This invention relates to voting systems, and more particularly to systems for controlling tabulation and integrity of the voting process.

BACKGROUND OF THE INVENTION

In many countries voting is mandatory and there can be twenty or thirty political parties at one time. A voter can vote for more than one person in a party or can vote for everyone in every party.

Currently votes are tabulated by hand. This is a long arduous labor intensive process which consumes time and is expensive. In some countries, like Belgium, more than a quarter of the population are paid employees of the Ministry of Internal Affairs just for this voting process. Votes occur often and it is usually mandatory that each person votes at each election. There are civil penalties for failure to vote and thus the system must keep track of who has voted and who has not. Thus, any automated system should allow for the automatic issuance of a summons to people who have not voted.

Part of the requirements of the system is that it be easy to set up by nontechnical people who are not capable of adding boards to PC's and wiring networks together. Elections are usually held in school rooms or in cafeterias, but in many cases, there is no power, and the system cannot count on telephone lines or networks available to tie polling places together. The system must be very portable and easy to set up. The equipment must be stored for long periods of time and stored in a small amount of space. There must be hard copy produced from this process that will last for at least thirty days for recounts. Also, the election results must be able to returned within one day. Above all, the system must provide the population with a high degree of confidence that the results are correct. This then argues for redundancy and backups to insure the integrity of the vote.

The hard copy requirement is particularly difficult because as the voting goes on, it is mandatory that people do not see the vote and consequently, the hard copy has to be stored in a manner so that it is not viewable until the results are finished. At that point it must be easily tabulated while still preserving the secret ballot. Voters must be able to see each other and the election judges must not be able to see the voters vote.

The system must be able to be run in multiple languages. The Belgium system, for example, must run in French and Dutch, and also, in some sections of the country, in German.

It would be useful if the system had alternate uses other than the voting system so the terminals could be used for any multiple choice quiz, such as civil service exams, or driver's examinations.

SUMMARY OF THE INVENTION

These and other objects are accomplished by a system in which there are a number of portable terminals that can be hand held at any site. The terminals can operate on battery power if necessary. The system is designed such that a person checks with an election judge, and after being qualified, receives an individual card with a bar code printed on it. The bar code information does not identify the individual specifically, but gives permission for the vote to be tabulated and also provides an indication as to what language the terminal will be operative in.

The system consists of three major components. The first is the registration system which, for example, could be a PC with a data base of the qualified voters. The voter, once qualified, is given a card, and proceeds over to one of the hand held terminals. The voter then inserts the card and the card tells the terminal what language the voter speaks. At this point the card is immediately written over by a thermal bar code printer so that it cannot be used again.

On the screen in front of the voter, which can be on a touch screen, the voter will see indications that the terminal is working, i.e., the question "are you ready to vote?" will appear. The voter will go through the voting process which will be essentially choosing from lists of political parties and candidates within the political parties.

When the voter has voted to his/her satisfaction, the terminal will inquire "are you finished?" When the voter answers "yes" the terminal printer will print the results of that individual's vote on a bar code on the card and return the card to the voter. The results will allow the vote to be tabulated within the terminal on a removable memory. Then the vote will be added to the cumulative vote total in the terminal.

The voter will then take his/her card and deposit the card in a storage bin near the exit of the polling place. The storage bin, or urn, will read the bar code on the card and the cumulative results of all the people who have passed through that exit will be stored in the data urn. The actual card with the bar code of that individual's vote will drop into a hamper within the urn and will become the permanent hard copy that is maintained for thirty days. At the end of the day the people whose names have not been marked off as having deposited their cards within the urn will be issued a summons for them to appear before a magistrate.

For tabulation, each of the terminals will hold the cumulative results of all the people who have voted using that terminal. Those results are stored on an internal memory that is accessible using a data port and also stored on a RAM card. At the end of the day the voting judge will take the RAM cards from each of the terminals. The RAM cards will then go to a counting machine which will, for example, be a laptop PC with a RAM card reader on it. Each of the RAM cards will be inserted in the counting machine and the cumulative results of the terminals will be matched against the totals from the urn, as contained on a RAM card from the urn.

Each of the terminals has the voting data stored in two places. One place is on a RAM card that is removable by an election judge. This RAM card will be locked up so it is not accessible by the individual voters. The second place where data is stored is on a nonvolatile RAM inside the terminal itself. That data can be accessed by a port that is on the terminal.

Accordingly, it is one technical advantage of this invention to provide a secure trackable voting system which prevents a voter from multiple voting, selects the proper language for a voter, tracks the voter's cumulative votes in a private manner and allows for all the votes cast at a polling place to be tabulated quickly and maintained secretly, but easily recoverable, for a period of time.

It is a further technical advantage of this invention that a voter's authorization card can be issued on an election-by-election basis and usable to control a voting terminal for a single voting session. The card will allow for the tabulation and storage thereon of the voter's selections, which tabulations then can be used to validate the voting process by allowing for an independent tabulation separate from the actual voting terminals.

It is a still further technical advantage of this invention that each terminal in the voting system is responsive to an external information keyed card for activation and for selection of the various choices available to the voter. The terminals each contain removable RAM memories for the purpose of storing thereon the cumulative tabulations of all of the voters using that terminal.

BRIEF DESCRIPTION OF THE DRAWINGS

A more complete understanding of the present invention may be acquired by referring to the detailed description and claims when considered in connection with the accompanying drawings in which like reference numbers indicate like features wherein:

DETAILED DESCRIPTION OF THE INVENTION

Figure 1:
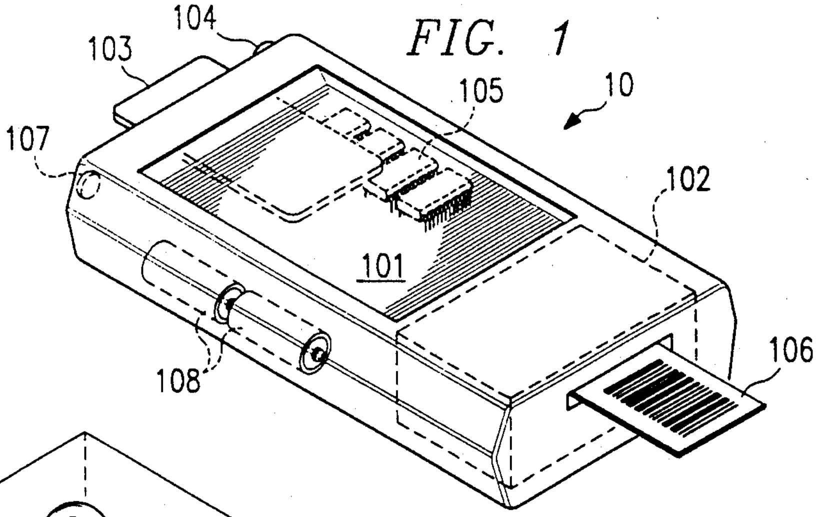
FIG. 1 discloses the voting terminal of the disclosed polling system in perspective.

FIG. 1 depicts the first component of the disclosed voting system. Voting terminal 10 is a hand held device approximately 7"×9". It is dominated by a liquid crystal display and touch overlay screen 101. Voting terminal 10 also contains a removable RAM card 103 electronically linked to non-volatile RAM 105. Data port 104 allows access to the information in RAM 105. Voting terminal 10 runs on batteries 108 or can work with an AC adapter that is plugged into external power connector 107. A thermal bar code reader-printer 102 is located in the front of the device and is accessible by the voter (not shown).

In operation a voter inserts a paper voting card 106 into printer-reader 102. The voting card 106 authorizes the individual to cast a ballot and indicates the voter's language preference. After reader-printer 102 reads paper card 106, LCD touch overlay screen 101 displays the election information in the appropriate language. A voter indicates his or her voting preferences on LCD touch overlay screen 101 which are then stored on the removable RAM card 103 and in non-volatile RAM 105. RAM card 103 is programmed to contain the specific election choices prior to the election day. When the voting process is complete, the individual's vote or votes are recorded on voting card 106 by reader-printer 102 and returned to the voter. Reader-printer 102 records the individual's vote in machine readable form only (bar codes) and renders the voting card incapable of further use by the voter.

RAM card 103 is removable only by an authorized election judge and is locked inside the voting terminal. The cumulative results of all voters who have used the particular terminal are also stored in non-volatile RAM 105. Non-volatile RAM 105 may be accessed by data port 104. Voting terminal 10 will run for the entire election period or for about 10 hours on batteries 108. In the event of battery failure, the voting terminal may be powered externally through connector 107. External power connector 107 also recharges batteries 108.

Figure 2:
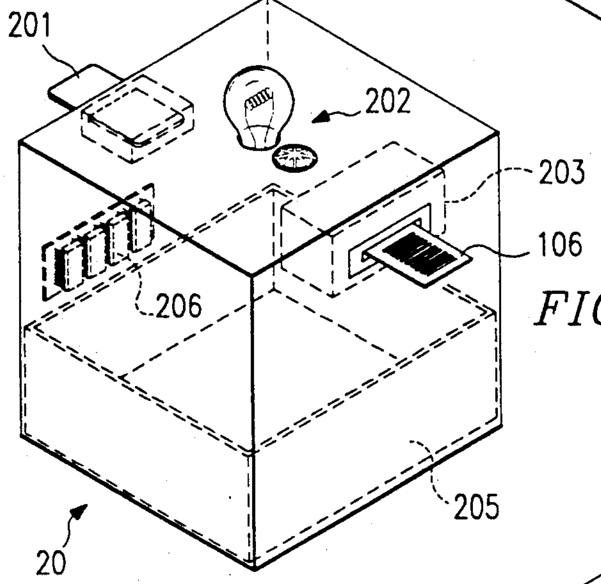
FIG. 2 depicts the intermediate tabulation element of the disclosed polling system.

FIG. 2 depicts data urn 20. When an individual voter has completed the voting process and paper card 106 has been returned to him by voting terminal 10, paper card 106 is inserted into bar code reader 203 of data urn 20. Bar code reader 203 scans the individual's vote as recorded on paper card 106. The voting data is electronically stored on removable RAM card 201 and in non-volatile RAM 206. Non-volatile RAM 206 can be accessed from a data port (not shown) if removable RAM card 201 fails. When an individual has successfully registered his vote in data urn 20, a visual or audio signal announces the fact to the voter. Light bulb 202, for instance, will flash after a successful tabulation. Both RAM card 201 and non-volatile RAM 206 store the cumulative results of all voters who have inserted their paper cards 106 into data urn 20.

Paper cards 106 then fall into paper card receptacle for cards 205 where they remain as hard copies of the results of the election. In certain countries, it is a constitutional requirement that election officials maintain such hard copy for recount purposes for thirty days after the election.

Figure 3:
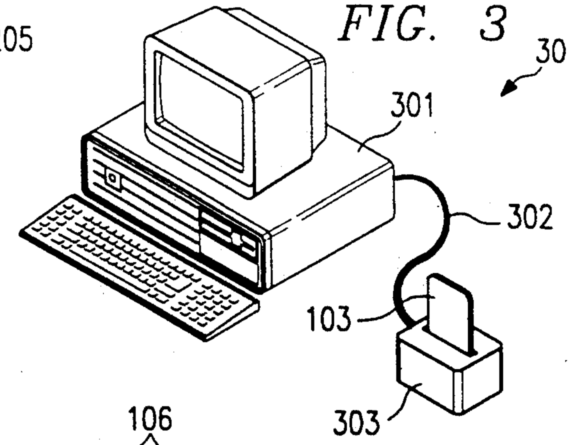
FIG. 3 illustrates the final counting element of the disclosed polling system.

FIG. 3 depicts counting system 30 used to determine the outcome of the election. Counting system 30 consists of RAM card reader 303 connected to personal computer 301 by cable 302. An election judge collects RAM cards 103 from all the voting terminals and all the data urns within a specified area. The cards are read one after another by RAM card reader 303. The cumulative results of the voting is displayed by computer 301. The cumulative results from the data urn RAM card must match the cumulative results of the voting terminal RAM cards. In the event of a mismatch between any of the data urn RAM cards and the corresponding video RAM cards, the election judge will connect computer 301 directly to the identified video and data urn RAM cards through the appropriate data port. The non-volatile RAM of each device is capable of providing a cross-check against subsystem failure or operator error. The election judge also collects the paper cards stored in receptacle 205 for a possible recount at the end of the election period.

Figure 4:
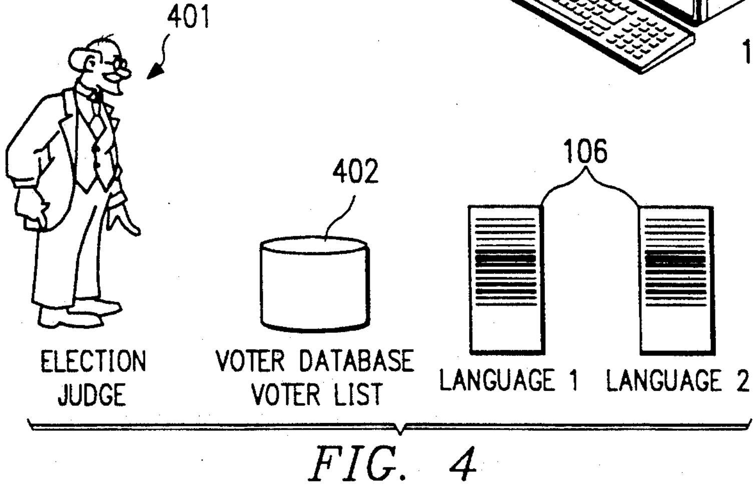
FIG. 4 shows, in block diagram, duties of the election judge in the disclosed polling system.

FIG. 4 more specifically illustrates how an election judge 401 oversees the initial voting process. Election judge 401 ensures that each individual is qualified to vote by consulting a voter data base 402. If so qualified, election judge 401 will issue a paper card 106 entitling the individual to cast his ballot. Paper cards 106 are produced in classes indicative of the language that the voting terminal (not shown) should present to the qualified voter. The voting terminal, for instance, may present choices to Belgium voters in either French, Dutch or German, and may present to American voters, ballots in English or Spanish. The voter then casts his ballot on the voting terminal in accordance with the discussion regarding FIGS. 1 and 2. By tracking those individuals who are issued paper cards pursuant to voter data base 402, the election judge can easily determine which qualified voters failed to vote. In some countries, this determination is necessary to comply with statutes which mandate fines for failing to vote.

Election judge 401 has additional duties after the polls have closed including removing RAM cards, collecting spent paper cards and tabulating final electoral results. These duties have already been described in FIGS. 1, 2 and 3.

One embodiment of the invention may use election application software controlled by election officials to set up data bases for new elections. The application has a graphical user interface that facilitates the entry of political parties and candidates in multiple languages. Also included are test sites and a validation program that ensures the integrity of the election data base. The data base is downloadable via RAM cards to the voting terminals. The election application software is written in an industry standard C to be easily maintainable and modifiable and runs on MS DOS (286, 386) class machines with ports for the RAM card reader/writers.

The voting terminal software allows elections to be conducted in a standalone fashion in multiple languages, using RAM cards downloaded with election data bases via the election application software. The low level voting terminal software includes a module to read the election data base from the RAM card, a module for writing election results to both the removable RAM card and the internal nonvolatile RAM, software to upload election results contained in the terminal nonvolatile RAM through the terminal's data port, LCD and touch screen drivers, and drivers for the bar code reader-printer. The voting application software includes an election application shell, an election data base interpreter, an interface to the election data base, and software to tabulate the cumulative election results. The voting terminal software is written in a combination of assembly code (low level device drivers) and an industry standard C.

The data urn software includes a driver for the bar code reader to tabulate individual votes as paper ballots are placed in the data urn, software to verify that the bar coded card has been correctly read and that the voter's voting obligation has been satisfied, software for storing cumulative results in a removable RAM card and in internal nonvolatile RAM, and software for uploading software through the data urn's data port. The data urn software is written in a combination of assembly code (low level device drivers) and an industry standard C.

The counting system software is used by election officials to tabulate election results. The software has a graphical user interface that facilitates the uploading of election results from the removable RAM cards taken from voting terminals and the data urns. In the event of an inconsistency between voting terminal results and data urn results, the counting system software will direct the election official to the faulty RAM cars and instruct the official to upload the intern memory of the particular devices. The counting system software is written in an industry standard C to be easily maintainable and modifiable and runs on MS DOS (286, 386) class machines with ports for the RAM card reader/writers.

Each of the systems may have diagnostic software included to notify the election officials in the event of a detected fault. Alternate terminals could then be used.

Although this description described the invention with reference to the above specified embodiments, the claims and not this description limit the scope of the invention. Various modifications of the disclosed embodiment as well as alternative embodiments of the invention, will become apparent to persons skilled in the art upon reference to the above description. Therefore, the appended claims will cover such modifications that fall within the true scope of the invention.

What is claimed is:

1. A polling system for recording selected choices of a plurality of individuals, said system comprising:

a terminal for providing to a user a plurality of selective choices;

a removable key containing information for enabling said terminal for a particular user; and a system operative when said key is used with said terminal to modify said information contained on said user's key to preclude the subsequent use of said key to enable any terminal.

2. The system set forth in claim 1 wherein said terminal includes:

circuitry for tabulating by choice the selected choices of a plurality of said users; and a removable memory for storing thereon said tabulations.

3. The system set forth in claim 2 wherein said terminal further comprises:

a permanent memory for also storing said tabulations.

4. The system set forth in claim 3 wherein said terminal further comprises:

a system to remotely read said permanent memory stored tabulations.

5. The system set forth in claim 1 wherein said terminal includes:

circuitry for tabulating by choice the selected choices of said user; and wherein said modification system includes the addition of said tabulated choices of said user into said key information.

6. The system set forth in claim 5 further comprising:

a permanent storage unit for retaining used ones of said keys; and wherein said storage unit contains circuitry for reading said key information.

7. The system set forth in claim 6 wherein said storage unit further includes:

circuitry for tabulating by choice the selected choices of a plurality of said users.

8. The system set forth in claim 8 wherein said storage unit further includes:

a memory for storing therein said tabulations.

9. The system set forth in claim 8 wherein said terminal further comprises:

circuitry for tabulating by choice the selected choices of a plurality of said users; and a memory for storing therein said tabulations wherein there is provided circuitry for comparing said tabulations stored in said terminal memory against said tabulations stored in said storage memory.

10. The system set forth in claim 1 wherein the choices which are presented to said user are in a determined specific language controlled by said key information.

11. The system set forth in claim 1 wherein said information modification precludes the subsequent use of said key to enable any terminal.

12. The system set forth in claim 11 wherein said machine readable information is bar coded.

13. The system set forth in claim 11 wherein said machine readable information is magnetic strip applied.

14. The system set forth in claim 1 wherein said information on said key is machine readable.

15. The system set forth in claim 1 wherein said terminal includes a bar code printer for modifying said information.

16. A method of monitoring voting in a public polling place, said method comprising the steps of:

issuing to a user an identification card containing machine readable information thereon;

activating a voting terminal by the insertion of said issued card by said user into said voting terminal;

establishing on said terminal in accordance with certain of said information on said inserted card a plurality of voting choices for selection by said user; and modifying said machine readable card information as a result of said insertion in said terminal.

17. The method set forth in claim 16 wherein said modifying step includes the step of:

changing said information such that said card cannot activate any other terminal.

18. The method set forth in claim 16 wherein said modification step includes the step of:

adding to said information of said user's card the tabulated results of said user's selected choices.

19. The method set forth in claim 18 further comprising the step of:

storing said tabulations on a permanent memory.

20. The method set forth in claim 21 further comprising the step of:

remotely reading said permanent memory stored tabulations.

21. The method set forth in claim 16 wherein said method includes the steps of:

tabulating by choice the selected choices of a plurality of said users; and storing said tabulations on a removable memory.

22. The method set forth in claim 6 further comprising the step of:

retaining used ones of said cards in a permanent storage unit; and within said storage unit reading said key information.

23. The method set forth in claim 22 further including the step of:

within said storage unit tabulating by choice the selected choices of a plurality of said users.

24. The method set forth in claim 22 further including the step of:

storing within said storage unit said tabulations.

25. The method set forth in claim 24 further including the step of:

tabulating within said terminal by choice the selected choices of a plurality of said users; and storing within said terminal said tabulations; and 26. The method set forth in claim 16 further including the step of:

determining specific language to present said choices to said user as a function of said key information.

27. The method set forth in claim 17 wherein said information on said key is machine readable.

28. The method set forth in claim 27 wherein said machine readable information is bar coded.

29. The method of operating a polling system for recording selected choices of a plurality of individuals, said method comprising the steps of:

controllably providing to a user a plurality of selective choices;

providing to said user a removable key containing information for enabling said user to access to said selective choices; and modifying said information contained on said user's key when said key is used.

30. The method set forth in claim 29 further including the step of:

determining which choices are presented to said user in accordance with information on said key.

31. A terminal for counting votes, said terminal comprising:

a plurality of selectable issues to be voted upon by a user;

control circuitry for selecting a subset of said issues for a particular user; and a key receptor for responding to information contained on a mechanical key inserted into said terminal by a user, said response including the enablement of said control circuitry unique to said user.

32. The terminal set forth in claim 31 wherein said terminal includes:

circuitry for tabulating the votes for all users for all possible issues; and a removable memory for storing thereon said tabulated votes for all said issues.

33. The terminal set forth in claim 32 wherein said terminal includes a mechanical printer for printing on said mechanical key data representative of said tabulated votes of said user.

34. The terminal set forth in claim 33 wherein said terminal includes:

blanking circuitry for changing said information on said key.

35. A vote gathering system comprising:

a plurality of terminals each for presenting voting choices to users, said terminals including:

a mechanical key containing machine readable data, said key operative to enable said terminal unique to said user and operative to receive thereon machine readable data provided by said terminal representative to the tabulated voting results of said user;

circuitry for tabulating the voting results of each user as well as the tabulated results of all users and further including a memory for storing all said tabulated results; and a storage urn for receiving and permanently storing the mechanical keys from all said terminals upon which said tabulated data has been received thereon, said urn operative to read said tabulated data from each said key and to establish a new tabulated result of voting from all terminals.

36. The system set forth in claim 35 further including:

a system for comprising said new tabulated result from said urn with the tabulated results from said plurality of terminals.

37. The system set forth in claim 36 wherein said memory is removable from each bin terminal.

38. The system set forth in claim 37 wherein said comparing system includes circuitry for remotely reading said plurality of removable memories together with a memory removable from said urn.

* * * * *